J. KNICKERBOCKER.
Damper.
No. 48,695.
Patented July 11, 1865.
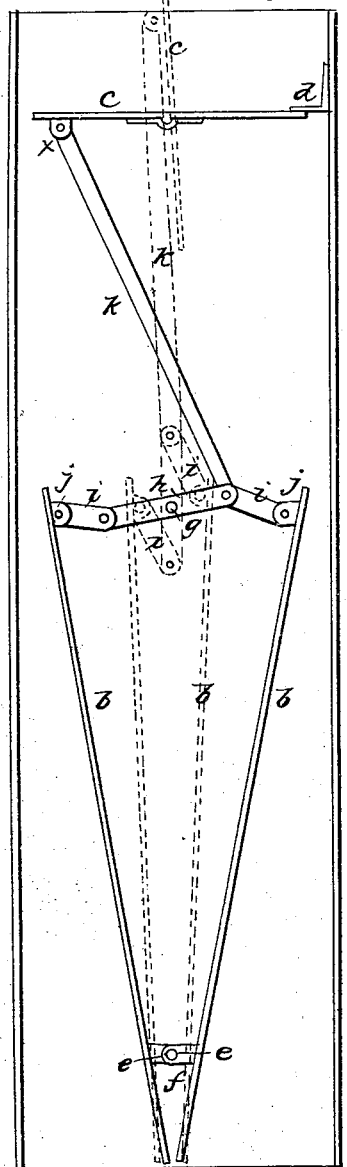
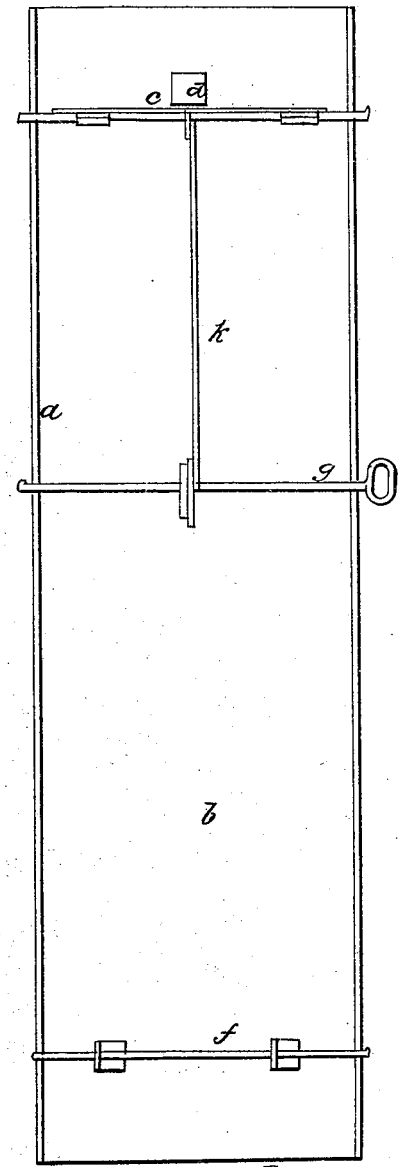

UNITED STATES PATENT OFFICE.

JOHN KNICKERBOCKER, OF HARTFORD, CONNECTICUT.

DAMPER.

Specification forming part of Letters Patent No. 48,695, dated July 11, 1865.

*To all whom it may concern:*

Be it known that I, JOHN KNICKERBOCKER, of the city and county of Hartford and State of Connecticut, have invented certain new and useful Improvements in Devices for Dampers and Radiators for Stove-Pipes, &c.; and I do hereby declare that the same is described and represented in the following specification and drawings; and to enable others skilled in the art to make and use the same, I will proceed to describe its construction by referring to the drawings, in which the same letters indicate like parts in each of the figures, the nature of which will be fully understood from the specification and drawings, the object of which is to graduate the draft and radiate the greatest amount of heat from the stove or other heating apparatus into the apartments.

In the accompanying drawings, Figure 1 is a sectional elevation, showing the mechanism in detail. Fig. 2 is a sectional elevation taken at right angles with Fig. 1.

$a$ is a cylindrical pipe, of any desirable size and shape.

$b$ are radiating-plates, provided with hinges $e$ and hung upon a fulcrum-pin, $f$, near the lower end of the section of pipe, so that when they are thrown open the lower ends will nearly close together in the center of the pipe and allow the heat to separate, and as it ascends to expend itself upon the surface of the pipe, and consequently a greater amount of heat will be radiated therefrom into the apartment.

$c$ is a damper of the ordinary construction, except that it is provided with a stop, $d$, and hinge joint $x$, so as to prevent its oscillating or to turn past the center. The shape of the plates $b$ (see $b$, Fig. 2) should be such as to nearly fit to the sides of the pipe, whether the pipe be made round or other shape, except that the upper end should be cut so as to allow a small draft-opening.

$g$ is an adjusting rod and handle, for adjusting both the damper $c$ and the plates $b$ into the desired position. Upon this rod, and near the center of the pipe, is secured an arm, $h$, extending equal distance each way therefrom, to the ends of which I connect the upper ends of the plates $b$ by means of links $i$ and joints $j$, and from one end of the arm $h$ to the joint $x$, near the outer edge of the damper $c$, is formed a connection by means of the arm $k$.

The operation will be seen by the red and dark lines. The red lines show the device closed up, leaving passage open, while the dark lines show the passage nearly closed. Thus I am enabled to check the draft more or less, as desirable, and to secure a greater amount of heat radiated from the pipe by the combined action of the damper and the radiating-plates.

I believe I have thus shown the nature, construction, and operation of this improvement so as to enable others skilled in the art to make and use the same therefrom.

What I claim, therefore, and desire to secure by Letters Patent, is—

As a new improved article of manufacture, viz., the combination of the plates $b$ with the damper $c$ and adjusting-rod $g$, with their connections, substantially as and for the purpose described.

JOHN KNICKERBOCKER.

Witnesses:
JAMES KNICKERBOCKER,
JEREMY W. BLISS.